United States Patent
Diehl et al.

(10) Patent No.: US 7,152,915 B2
(45) Date of Patent: Dec. 26, 2006

(54) RADIATOR GRILLE FOR MOUNTING IN A RADIATOR GRILLE ARRANGEMENT AND METHOD OF PRODUCING IT

(75) Inventors: Peter Diehl, Kirchheim (DE); Ali Aigner, Stuttgart (DE); Marc Huttenlocher, Nurtingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 56 days.

(21) Appl. No.: 10/913,834

(22) Filed: Aug. 6, 2004

(65) Prior Publication Data
US 2005/0006928 A1 Jan. 13, 2005

(51) Int. Cl.
*B60R 19/52* (2006.01)

(52) U.S. Cl. .................. 296/193.1; 293/115; 180/68.6

(58) Field of Classification Search ................ 296/115, 296/193.1; 180/68.6; 427/258; 293/115
See application file for complete search history.

(56) References Cited

U.S. PATENT DOCUMENTS

| | | | |
|---|---|---|---|
| 3,792,889 A | | 2/1974 | Fuener et al. |
| 4,944,540 A | * | 7/1990 | Mansoor et al. ............ 293/115 |
| 5,087,654 A | * | 2/1992 | Harada et al. ............... 524/432 |
| 5,208,081 A | * | 5/1993 | Gubitz et al. .................. 428/31 |
| 5,503,444 A | * | 4/1996 | Rouse et al. ................. 293/115 |
| 6,328,358 B1 | * | 12/2001 | Berweiler .................... 293/115 |
| 6,422,643 B1 | * | 7/2002 | Pease ...................... 296/193.1 |
| 6,957,837 B1 | * | 10/2005 | Stull ........................... 293/115 |
| 2002/0160206 A1 | * | 10/2002 | Hasegawa et al. .......... 428/426 |

FOREIGN PATENT DOCUMENTS

| | | |
|---|---|---|
| DE | 44 35 396 A1 | 8/1995 |
| EP | 0 896 892 A1 | 2/1999 |

OTHER PUBLICATIONS

English Abstract of DE 44 35 396 A1.

* cited by examiner

*Primary Examiner*—Lori L. Coletta
(74) *Attorney, Agent, or Firm*—Clark Hill PLC

(57) ABSTRACT

A radiator grille (10) for mounting in a motor vehicle radiator grille arrangement and a method of producing same, includes radiator grille having a substantially rigid frame (11) and at least one bar element (12) arranged within the frame (11). The bar element includes at least one end (12a) which, in the unassembled state of the radiator grille (10), is spaced from a portion (18) of the frame (11) and in the mounted state of the radiator grille (10) is forced into contact with the portion (18). The end (12a) of the bar element (12) and the portion (18) of the frame (11) being movable relative to one another as a result of the external application of force.

15 Claims, 3 Drawing Sheets

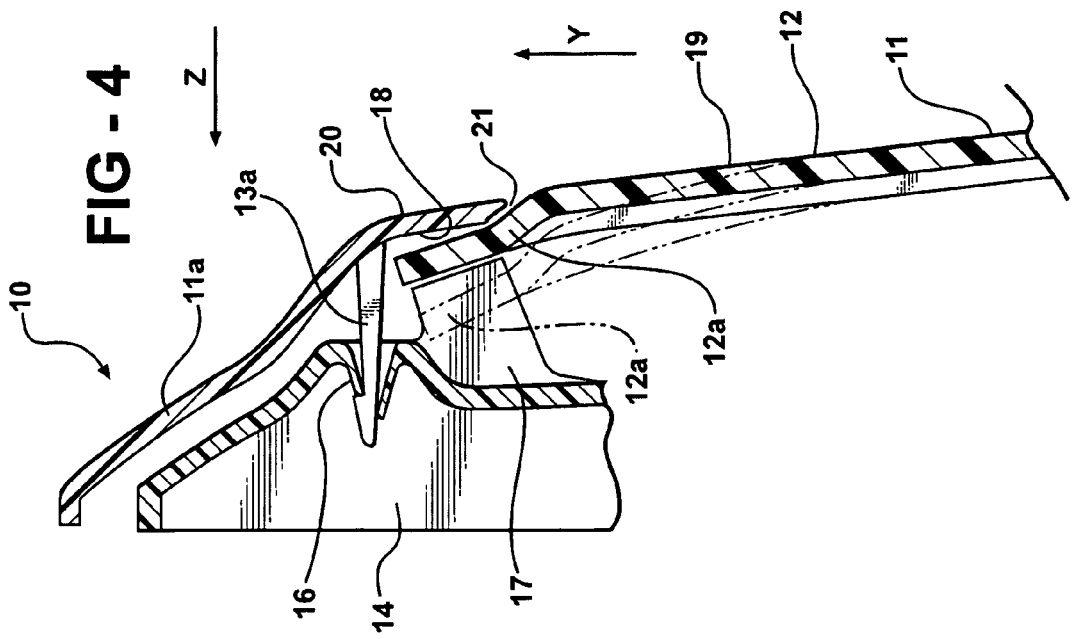
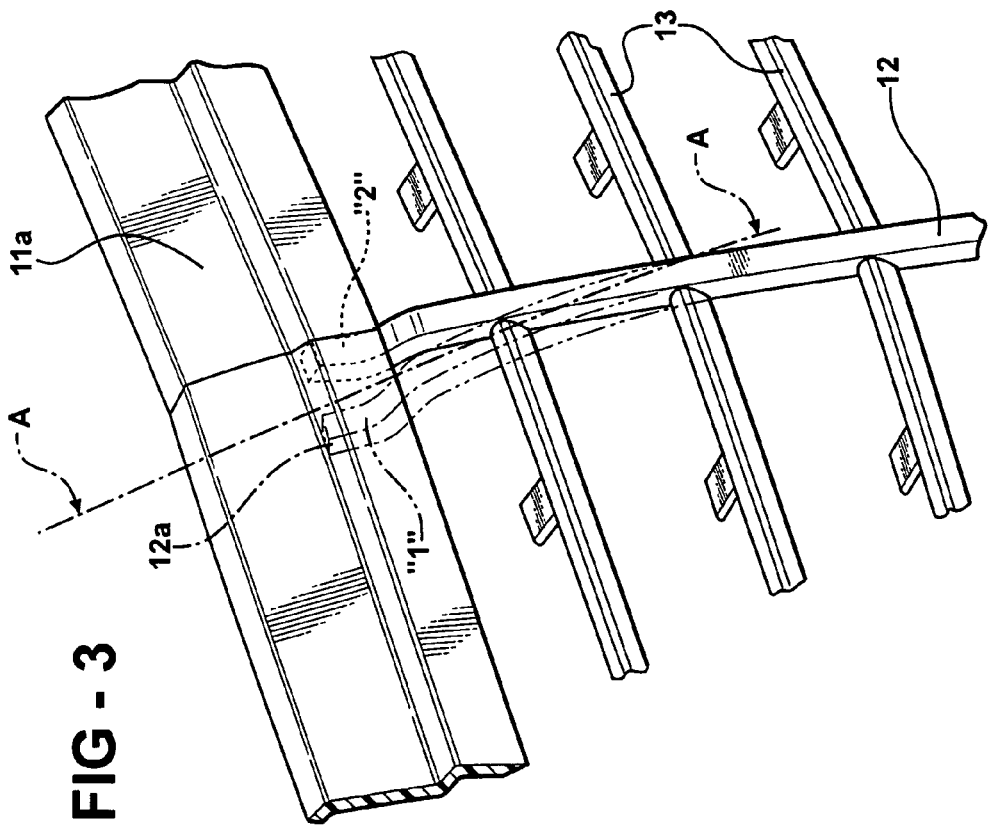

US 7,152,915 B2

RADIATOR GRILLE FOR MOUNTING IN A RADIATOR GRILLE ARRANGEMENT AND METHOD OF PRODUCING IT

BACKGROUND OF THE INVENTION

1. Field of the Invention

The invention relates to a radiator grille for mounting in a motor vehicle radiator grille arrangement, and a method of producing it.

2. Description of the Related Art

In motor vehicles, radiator grille arrangements are generally provided in which a radiator grille is mounted, for example, on a support member. The radiator grille generally has a rigid frame within which a bar element or a plurality of bar elements are arranged. As the result of a specific construction of the radiator grille together with the bar elements the vehicle is given a desired visual appearance which is individual to it. For a visually high quality appearance of the vehicle the radiator grille is usually chromium plated or specially painted.

In order to meet the relevant safety requirements for protecting pedestrians in the event of an impact, various embodiments are known from the art in which the radiator grille is guaranteed to be pivotable by means of being correspondingly movably mounted on the engine bonnet or on a component of the body work. Such an approach is described for example in U.S. Pat. No. 3,792,889 and in DE 44 35 396 A1. What is common to all these constructions is that the radiator grille per se is in each case constructed as a rigid component. In the event of a frontal impact this may have the disadvantage that in spite of being pivotable the radiator grille itself is damaged which necessitates expensive replacement of this component.

SUMMARY OF THE INVENTION

According to the invention the aim is to provide a radiator grille in which the risk of damage in the event of frontal impact is reduced.

The radiator grille according to the invention is provided for assembly in a radiator grille arrangement of a motor vehicle and generally has a substantially rigid frame and at least one bar element mounted within the frame. The bar element is preferably of oblong construction and, when the radiator grille is not mounted in the radiator grille arrangement, the bar element having at least one end spaced from a portion of the frame and the end being forced into contact with the frame when the radiator grille is in the mounted state. The one end of the bar element and the portion of the frame are movable relative to one another as the result of an external force acting on the radiator grille in the event of frontal impact.

The crucial advantage of the radiator grille according to the invention is provided by the mobility of one end of the bar element and the portion of the frame relative to one another, this mobility being present in the event of a force acting from outside, i.e. a frontal impact. One end of the bar element may also move relative to the portion of the frame in the position in which it is in forced contact with the portion, thus ensuring deflection or yielding of the bar element. Advantageously, this greatly reduces damage to the bar element, e.g. in the form of plastic deformation or even in the form of breakage or splintering. The yielding described also helps to reduce the risk of injury to pedestrians.

The radiator grille according to the invention is such that in its so-called "initial position", i.e. after manufacture but before assembly in a vehicle radiator grille arrangement, one end of the bar element is spaced from the portion of the frame. This has significant advantages during subsequent surface treatment, as will be explained below.

According to an advantageous feature of the invention, the bar element is spaced at both ends from a particular portion of the frame in the "initial position", as explained. Other bar elements are provided within the frame, which are connected on the one hand to the frame and also to the bar element, thereby fixing the position of the first bar element within the frame. All the bar elements together form a so-called spider component mounted within the frame.

According to an alternative embodiment of the invention, one end of the bar element is spaced from the portion of the frame as explained above, whereas the other end of the bar element is firmly attached to the frame. Particularly for cases where there is no spider component mounted within the frame, i.e. the bar element is arranged vertically within the frame, for example, without any other bar elements connected laterally thereto, a secure position or fixing is thus ensured for the bar element.

During the assembly of the radiator grille according to the invention in a vehicle radiator grille arrangement, the radiator grille is placed for example on a support component which in turn is connected in a known manner to the bonnet and/or a component of the body work of the vehicle. The support part is matched in dimensions to the radiator grille and has an abutment surface which in the assembled position bears against one end of the bar element, this end being spaced from the portion of the frame in the "initial position" of the radiator grille. The material used for the radiator grille is preferably such that one end of the bar element can be resiliently moved in the direction of the portion of the frame in the unassembled state of the radiator grille, i.e. when there is a spacing between one end of the bar element and the portion of the frame. Thus, it is readily possible to assemble the radiator grille with the support part, whereby the abutment surface of the support part presses one end of the bar element in the direction of the portion of the frame or the upper frame section. As a result of the contact pressure exerted by the abutment surface on one end of the bar element, the latter is forcibly brought into contact with the portion of the frame in the assembled state of the radiator grille. Thus, in the assembled state the bar element is no longer at a spacing from the portion of the frame; to the observer there is no noticeable gap between the outer surfaces of the bar element and the portion of the frame, and consequently the appearance of the vehicle meets the optical quality requirements.

Generally speaking, radiator grilles are chromium plated or otherwise specially painted in order to make a high quality and high value visual impression on the customer. Accordingly, in an advantageous embodiment the radiator grille according to the invention is subjected to surface treatment as a result of which the surface of the radiator grille is painted and/or chromium plated. Because of the spacing of one end of the bar element from the portion of the frame as explained previously, it is ensured when carrying out the surface treatment of the radiator grille that the total surface of the bar element is also treated in addition to the surface of the frame. If the surface treatment is carried out using an immersion bath method, which is known and will not be described in detail here, the spacing mentioned above can prevent so-called blind spots, which are spots in which part of the surface of the bar element remains untreated. This advantageously ensures that even in the event of small movements of the bar element relative to the portion of the frame, the visual quality is maintained in every position. Furthermore, regarding the carrying out of the surface treatment, there is the essential advantage that the radiator grille according to the invention can be taken for surface treatment immediately after manufacture. No other intermediate steps are required to move one end of the bar element away from the portion of the frame to create the desired spacing. This has a beneficial effect on the manufacturing costs.

According to an advantageous embodiment of the invention the frame has a first and a second frame section, while the portion of the frame with which one end of the bar element is brought into forcible contact in the assembled position of the radiator grille is formed in the first frame section, and the other end of the bar element may be firmly attached to the second frame section. This improves the position or fixing of the bar element.

According to another advantageous embodiment of the invention the portion of the frame in alignment with one end of the bar element has a recess, the dimensions of which are matched to one end of the bar element. When the radiator grille is assembled, i.e. when one end of the bar element is forcibly in contact with the portion of the frame, this end then engages in the recess, further helping to secure the bar element in precisely the right position. The recess is advantageously formed on a side of the frame remote from the direction of travel of the vehicle. Thus, the bar element is pressed into the position of forced contact against the portion of the frame, from behind, from the observer's point of view, in the assembled state, and this lastly ensures that the visual appearance of the radiator grille in the assembled position is sufficiently high quality. With normal observation the onlooker will not notice that the radiator grille according to the invention is not a conventional component which is rigid per se.

According to another advantageous embodiment of the invention the first frame section is a lower frame section and the second frame section is an upper frame section, these frame sections being substantially parallel to one another. The minimum of one bar element is preferably substantially vertical in position. The abovementioned recess in the portion is designed so that one end of the bar element can move upwards, i.e. along the vertical axis of the vehicle, in the event of frontal impact. In addition, one end of the bar element can move slightly in the direction of the longitudinal axis of the vehicle, counter to the direction of travel, with one end of the bar element lifting away from the portion of the frame as a result of the external application of force. This mobility of the bar element thus ensures that the bar element advantageously yields as explained above. If the surface of the bar element is chromium plated by surface treatment, in the event of frontal impact, the risk of the chrome flaking off can be substantially reduced by this mobility of the bar element.

For improved assembly with, for example, a support part of the radiator grille arrangement, in another advantageous embodiment of the invention the frame and/or the bar element and optionally the other bar elements each have at least one clip element by means of which the radiator grille can be clipped to the support part. Particularly secure assembly or fixing of the radiator grille can be achieved if a plurality of clip elements are provided on the associated bar elements. In order to ensure mobility of one end of the bar element as described above, the bar element or the bar elements each have recesses adjacent to a clip element. This tapering of the material reduces the strength of the bar element to a controlled degree locally, so that the radiator grille remains sufficiently flexible even in the clipped-together state.

With regard to the cheapest possible manufacture it is particularly advantageous to form the radiator grille according to the invention in one piece. The so-called injection moulding process is preferably used for this, by means of which the radiator grille according to the invention can be produced from a thermoplastic plastic in particular. It is particularly advantageous that the radiator grille can be removed from the injection mould after cooling as an injection moulding and one end of the bar element is "locally pre-bent" so as to be spaced from the portion of the frame, as explained above. If a thermoplastic plastic is used one end of the bar element is thus resiliently movable in the direction of the portion of the frame, so that it is readily possible to assemble the radiator grille in the radiator grille arrangement in which the bar element is deformed and forcibly brought into contact with the portion of the frame.

Alternatively, or in addition to the recesses described previously which are provided on the other bar elements adjacent to the clip elements, it is also possible when producing the radiator grille from plastic to injection-mould the bar elements in the portions mentioned so that they are thinner, thereby providing the desired flexibility of the bar elements by the thinner material cross-section as well.

The process according to the invention for producing a surface-treated radiator grille according to one aspect of the invention, which is intended for assembly in a motor vehicle radiator grille arrangement, includes a radiator grille (10) having a substantially rigid frame (11) and at least one bar element (12) having at least one end (12a) which is spaced from one portion of the frame (11), in the unassembled state and is forcibly brought into contact with the portion of the frame in the mounted state, is characterised in that the radiator grille is originally shaped in one operation and then surface treatment of the surface of the radiator grille is carried out. Advantageously, between the original shaping and the surface treatment no further preparation is required with regard to the radiator grille, e.g. in the form of pressing the bar element away from a portion of the frame in order to avoid the formation of so-called blind spots, as already mentioned above.

Further advantages and features of the invention will become apparent from the description and the accompanying drawings.

It will be realised that the features mentioned above and those which have yet to be explained can be used not only in the combination specified but also in other combinations or on their own without departing from the scope of the present invention.

BRIEF DESCRIPTION OF THE DRAWINGS

The invention is schematically illustrated by means of an embodiment and is hereinafter described in detail with reference to the figures, wherein:

FIG. 3 shows an enlarged view of the portion I in FIG. 1 in simplified perspective view; and FIG. 4 shows a detail of a lateral cross-sectional view of the radiator grille according to the invention.

DETAILED DESCRIPTION OF THE INVENTION

Figure 1A:
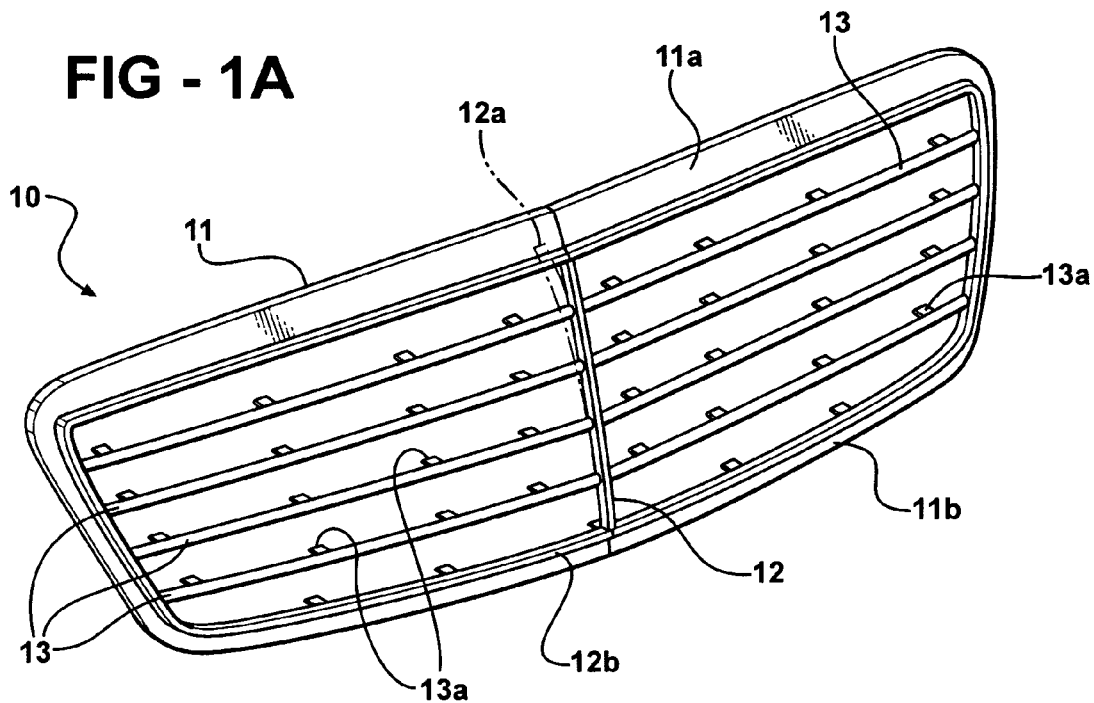
FIG. 1a is a perspective view of a radiator grille according to the invention.

FIG. 1a shows a radiator grille 10 according to the invention in perspective. The radiator grille 10 has a frame 11 which is substantially rectangular in the embodiment shown here. It will be understood without further explanation that the frame 11 may also have any other desired external shape. The dimensions of the frame 11 both in width and in cross-section are such that it has sufficiently high inherent rigidity against bending and torsion. Within the frame 11 is mounted at least one bar element 12 which is connected to other bar elements 13 along its two longitudinal sides. The bar element 12 and the other bar elements 13 together form a so-called spider component which substantially fills the interior of the frame 11.

The frame 11 specifically has an upper frame section 11a and a lower frame section 11b. Dotted lines in FIG. 1a show one end 12a of the bar element 12 in a position in which the radiator grille 10 is not mounted in a radiator grille arrangement of a motor vehicle (cf. the following explanation of FIG. 2). The method of producing the radiator grille 10 is such that the end 12a of the bar element 12 is in the position indicated by broken lines in FIG. 1 after the manufacture of the radiator grille, the so-called initial position. In this position the end 12a is thus "locally pre-bent" and thus at a spacing from a portion (concealed in this view) of the upper frame section 11a.

In the embodiment shown here one end 12a of the bar element 12 is spaced from the portion of the upper frame section 11a in the initial position of the radiator grille. The other end 12b of the two ends of the bar element, on the other hand, is firmly attached to the lower frame section 11b, thus securely fixing the bar element 12 in precisely the correct position.

Figure 1B:
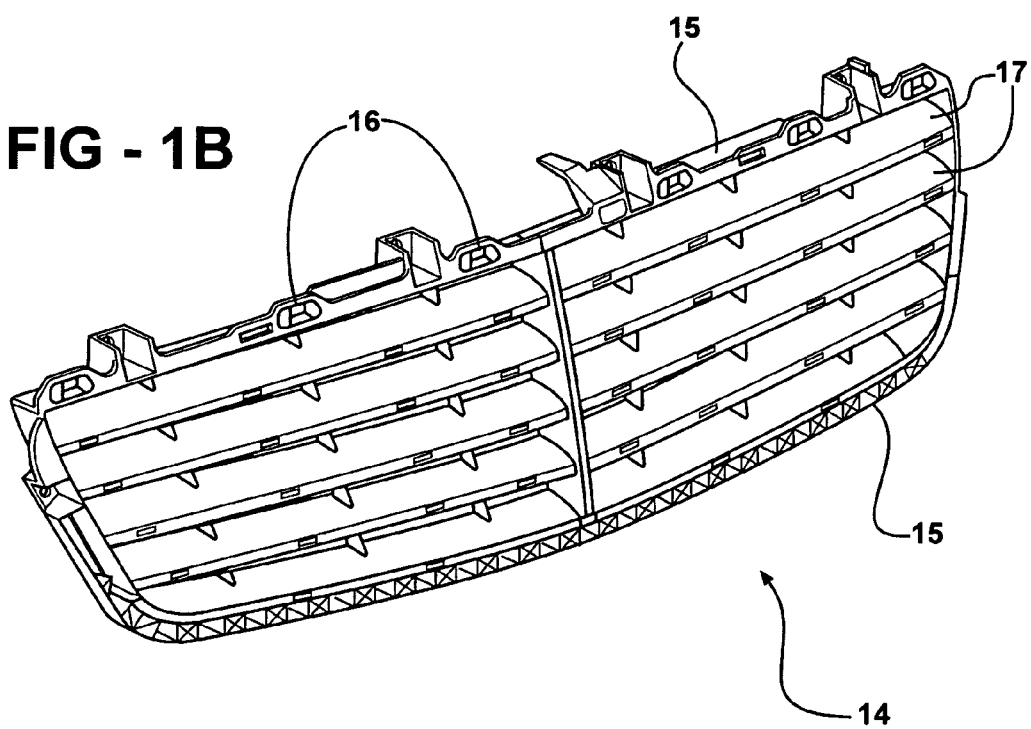
FIG. 1b shows a perspective view of a support part of a radiator grille arrangement, this support part being intended for assembly with the radiator grille in FIG. 1.

The radiator grille 10 shown in FIG. 1 is intended for fitting in a radiator grille arrangement of a motor vehicle. It may be mounted for example on a support part, the dimensions of which are preferably matched to the dimensions of the radiator grille. A support part of this kind is designated 14 in FIG. 1b in perspective view. In is designated 14 in FIG. 1b in perspective view. In an encircling outer portion 15 the support part 14 has a plurality of openings 16. On a rear side of the frame 11 of the radiator grille 10 there may be a number of clip elements (not shown) which can be clipped to the openings 16 in the support part 14. In this way the radiator grille 10 can be mounted on the support part 14. The support part 14 has a plurality of horizontally extending bars 17 aligned with the other bar elements 13 of the radiator grille 10. In the same way as on the frame 11, a plurality of clip elements (13a) (see FIG. 1a) which can be clipped to the bars 17 may also be provided on the other bar elements 13. Overall, sufficiently secure mounting of the radiator grille 10 on the support part 14 or to the radiator grille arrangement can thus be achieved.

Figure 2:
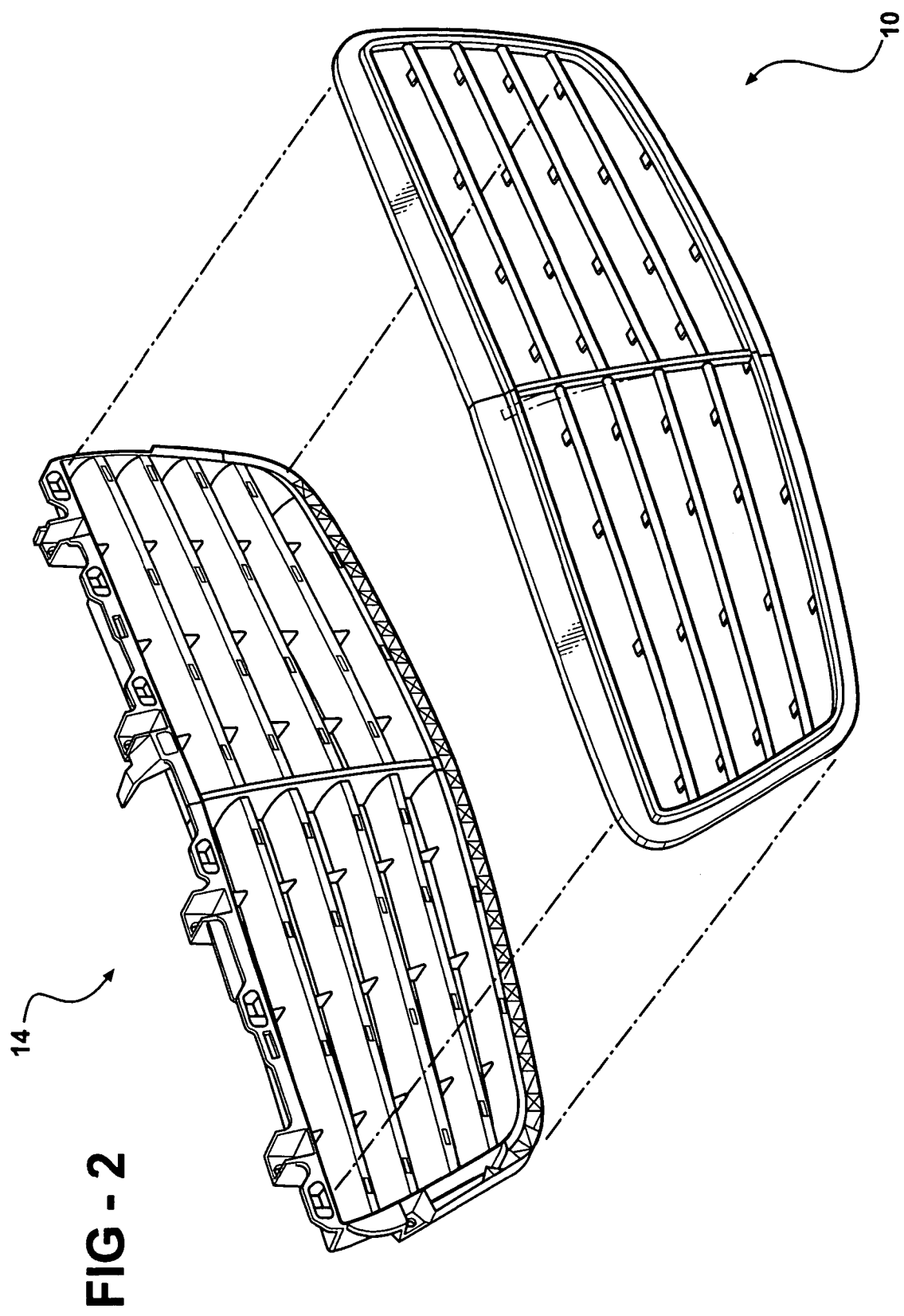
FIG. 2 shows a perspective view of the radiator grille according to the invention shown in FIG. 1 together with the support part of FIG. 2 adapted thereto.

FIG. 2 shows a perspective view of the radiator grille 10 and the support part 14. It will be seen that the two components are matched in their dimensions. Dotted arrows indicate that the radiator grille 10 is placed on the support part 14 from in front, for assembly, so that the clips described above can be used.

FIG. 3 shows the portion I of FIG. 1a in enlarged partial section. Reference numeral "1" denotes the position of the free end 12a of the bar element 12 which receives the end 12a after the manufacture of the radiator grille 10, before the latter is assembled with the support part 14. When the radiator grille 10 is assembled on the support part 14 the end 12a of the bar element 12 is pressed into the position designated "2". In this position the end 12a then bears against the upper frame section 11a from behind.

In other words, the end 12a is forcibly brought into contact with a portion 18 (FIG. 4) of the upper frame section 11a in the assembled state.

The section A—A indicated in FIG. 3 is shown in FIG. 4, in which the end 12a and the upper frame section 11a are shown in cross-section. In the same way as in FIG. 1a the end 12a of the bar element 12 is shown in a position marked by dotted lines which the end 12a occupies after the manufacture of the radiator grille 10. When the frame 11 of the radiator grille 10 is placed on the support part 14 (a detail of which is shown in FIG. 4), a projection 17 on the support part 14 presses against the end 12a from behind, and as a result of (preferably resilient) deformation this end is pressed against a portion 18 of the upper frame section 11a. In the assembled state of the radiator grille 10 in which the radiator grille is clipped to the support part 14, for example, the end 12a is thus forcibly brought into contact with the portion 18. As a result of this forcible contact an outer surface 19 of the bar element 12 adjoins an outer surface 20 of the upper frame section 1a virtually flush, the gap 21 between the end 12a and an edge of the upper frame section 11a being minimised to such an extent that the desired high quality visual impression is achieved.

The mounting of the radiator grille 10 on the support part 14 is suitably ensured by means of the clip elements (13a) which are arranged on a rear side of the frame 11, i.e. on a side remote from the direction of travel, and engaged by means of an undercut in corresponding openings 16 in the frame section 14. When the frame 11 is clipped to the support part 14, the end 12a of the bar element 12 is moved from its prestressed or initial position (shown by dotted lines in FIG. 4) into the so-called "end position" in which the end 12a is brought into forcible contact with the portion 18. In the assembled state shown in FIG. 4 the bar element 12 is movable, in the event of a frontal impact, i.e. in the event of external force acting thereon, both in the direction marked Y (vertical axis of the vehicle) and also in the direction marked Z (longitudinal direction of the vehicle, counter to the direction of travel). The bar element 12 of the radiator grille 10 is thus able to yield in these directions under the effect of an external force following an impact, thereby preventing damage to the radiator grille 10 (e.g. in the form of the splintering of any chrome layer or the like applied to the surface of the bar element, or in the form of splintering of the bar element 12 itself).

The dimensions of the frame 11 in width and in the thickness of the cross-section are sufficient to achieve the desired inherent rigidity. However, the dimensions are only large enough to allow the mobility of the bar element described above in directions Y and Z to go together with slight deformation of the frame 11, particularly the upper and lower frame sections (11a, 11b).

The portion 18 formed in the upper frame section 11a may also have a recess (not shown in FIG. 4) into which one end 12a of the bar element 12 engages when it is brought into forcible abutment in the assembled position. The recess is constructed so as to allow the above-mentioned mobility of the bar element in direction Y, whereas the bar element 12 is stabilised by corresponding flanks of the recess in the transverse direction of the vehicle. The position or fixing of the bar element 12 in the "normal position", i.e. in the assembled state of the radiator grille arrangement, is thereby improved.

The radiator grille 10 according to the invention is characterised in that it is not an inherently rigid component but that one of the ends of at least one bar element is movable, even in forced contact with a portion of the frame, relative thereto. Thus, the radiator grille 10 is advantageously flexible in construction so that the requirements of the relevant pendulum impact test are met. In this test fully resilient deflection of the test object is required at a speed of impact of up to 4 km/h. In addition, the radiator grille 10 according to the invention, when surface treatment is being carried out, has the advantage that the spacing of the end 12*a* from the portion 18 prevents the formation of so-called blind spots. No further preparation is required of the radiator grille 10 before the surface treatment. This significantly reduces the manufacturing costs of a chromium plated radiator grille, for example.

The invention claimed is:

1. A radiator grille (10) for mounting to a support part (14) of a motor vehicle, the radiator grille comprising:
   a substantially rigid frame (11);
   a plurality of spaced apart and parallel elongated lateral bar elements (13) for supporting the rigid frame (11) and fixedly attaching the radiator grille to the support part; and
   at least one bar element (12) arranged within the frame (11) transverse to said lateral bar elements, the bar element having a first end (12*b*) fixedly secured to the rigid frame and an opposite second end (12*a*) spaced from a portion (18) of the frame (11), in the unassembled state of the radiator grille (10), and being forcibly brought into contact with the portion (18) in the assembled state of the radiator grille (10), the second end (12*a*) of the bar element (12) being flexibly and elastically movable between and relative to the portion (18) of the frame (11) and the support part (14) as a result of the external application of force to prevent damage to the radiator grille.

2. A radiator grille (10) according to claim 1, wherein the second end (12*a*) of the bar element (12) is resiliently movable in the direction of the portion (18) in the unassembled state of the radiator grille (10).

3. A radiator grille (10) according to claim 2, wherein the portion (18) has a recess adapted to receive the second end (12*a*) of the bar element (12), in which the second end (12*a*) of the bar element (12) engages under forced contact.

4. A radiator grille (10) according to claim 3, wherein the portion is formed on a side of the frame (11) remote from the direction of travel.

5. A radiator grille (10) according to claim 4, wherein the frame (11) has first and second frame sections (11*a*, 11*b*) the portion (18) with which the second end (12*a*) of the bar element (12) is forcibly brought into contact in the assembled state of the radiator grille (10) being formed in the first frame section, while the first end of the bar element (12) is fixedly connected to the second frame section.

6. A radiator grille (10) according to claim 5, wherein the first frame section (11*b*) is a lower frame section and the second frame section (11*a*) is an upper frame section, the frame sections being substantially parallel to one another.

7. A radiator grille (10) according to claim 6, wherein the minimum of one bar element (12) is arranged substantially vertically.

8. A radiator grille (10) according to claim 7, wherein the plurality of lateral bar elements (13) are connected to at least one bar element (12) and thus together form a spider component.

9. A radiator grille (10) according to claim 8, wherein at least one of the frame (11) and the lateral bar elements (13) have at least one clip element (13*a*) for fixedly securing the radiator grille to the support part (14).

10. A radiator grille (10) according to claim 9, wherein the lateral bar elements (13) adjacent to the clip element (13*a*) have recesses, ensuring elastic deformation of the bar elements (13) under the effect of external force.

11. A radiator grille (10) according to claim 10 which is integral in construction.

12. A radiator grille (10) according to claim 11 which is made from plastic material, particularly a thermoplastic material.

13. A radiator grille (10) according to claim 12 which is subjected to surface treatment.

14. A radiator grille (10) according to claim 13, wherein the surface is painted.

15. A radiator grille (10) according to claim 13, wherein the surface is chromium plated.

* * * * *